Figures 1, 2:
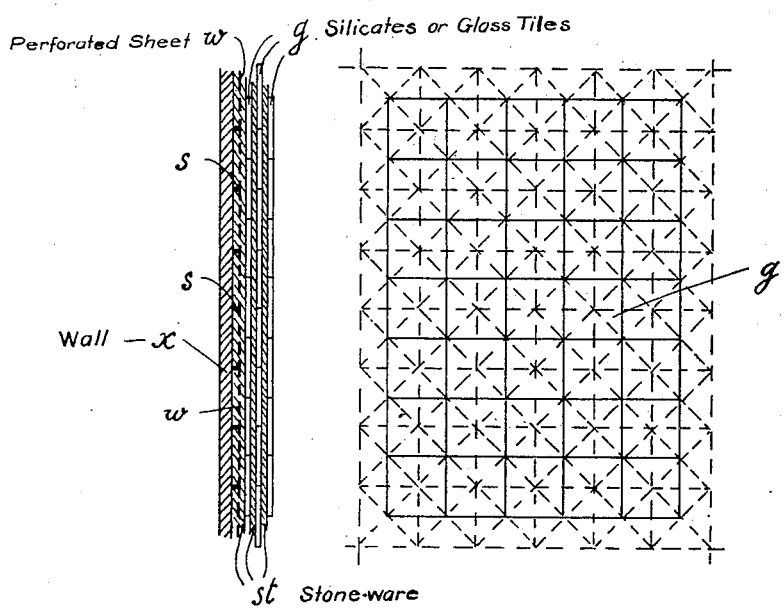

F. SCHÜLER.
LINING FOR TANKS.
APPLICATION FILED JUNE 10, 1919.

1,355,360. Patented Oct. 12, 1920.

UNITED STATES PATENT OFFICE.

FRIEDRICH SCHÜLER, OF FRANKFORT-ON-THE-MAIN, GERMANY.

LINING FOR TANKS.

1,355,360.     Specification of Letters Patent.     Patented Oct. 12, 1920.

Application filed June 10, 1919. Serial No. 303,259.

*To all whom it may concern:*

Be it known that I, FRIEDRICH SCHÜLER, a citizen of the German Republic, and residing at Frankfort-on-the-Main, Germany, have invented certain new and useful Improvements in Linings for Tanks, of which the following is a specification.

For chemical industrial purposes, tanks and vessels of various kinds are used, which are made of metal or alloys to suit requirements.

Beside internally leaded tanks or vessels, there are those used, which after leading are lined with acidproof bricks. Said linings require, however, much space owing to the thickness of the bricks. Furthermore, the very thick brick walls, with a tank that is heated from the outside by means of a steam-jacket, prevent an effective transmission of heat.

Thus, in practice there is a great want for a thin-walled inner lining firmly connected with the walls of the tank or vessels with a high security against penetration of liquid and corrosion, whereby even the usual leading becomes superfluous.

The present invention provides improved means by which the desired object is attained and which are represented by way of example on the annexed drawing, in which Figure 1 is a cross-section through the wall of a tank with inner protective lining while Fig. 2 is a diagrammatic front-view of the latter.

According to the invention, first a wickerwork or perforated sheet-metal $w$ is put on the walls $x$ to be protected at a short distance therefrom and firmly connected therewith at certain points by screws, riveting, or by welding, as indicated at $s$.

Then, upon and around said wickerwork, which is covered with a flux, an acidproof jointless thin layer of stone-ware $st$ is placed and said layer is covered or lined with silicates or glass-tiles $g$ having a thickness of about ⅛ of an inch. Thereupon, said covering or lining of silicates or glass-tiles is again coated with another layer of stone-ware $st$, and the latter is again covered or lined with silicates or glass-tiles $g$, and so on, with the result that as many alternate layers and linings are obtained as are desired for the purpose in question.

With the employment of glass-tiles, the latter are so arranged that the joints of one layer do not face those of the next layer but lie between the same or crosswise thereto (Fig. 2), whereby a penetration of liquid therethrough is effectively prevented.

For a good connection of the glass-tiles with the acidproof layer of stone-ware, the surface of the former is preferably roughened.

What I claim is:

1. A lining for tanks comprising a thin layer of stone-ware with a metal-insertion therein directly put on said walls, and alternate thin linings of silicates and layers of stone-ware respectively put on said base layer, substantially as and for the purpose set forth.

2. A lining for tanks comprising a thin layer of stone-ware with a metal-insertion therein directly put on said walls, and alternate thin linings of glass-tiles and layers of stone-ware respectively put on said base layer, substantially as and for the purpose set forth.

3. A lining for tanks comprising a thin layer of stone-ware with a metal-insertion therein directly put on said walls, and alternate thin linings of glass-tiles with roughened surface and layers of stone-ware respectively put on said base layer, substantially as and for the purpose set forth.

In testimony whereof I have hereunto set my hand in the presence of two subscribing witnesses.

F. SCHÜLER.

Witnesses:
   HUGO SUDENZ,
   GEORG ALBERT KUNZ.